(12) United States Patent
Srivastava et al.

(10) Patent No.: US 12,519,568 B2
(45) Date of Patent: Jan. 6, 2026

(54) SEMANTIC NETWORK DATA CORRECTION

(71) Applicant: Intel Corporation, Santa Clara, CA (US)

(72) Inventors: Amar Srivastava, Bangalore (IN); Kshitij Arun Doshi, Tempe, AZ (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 17/711,503

(22) Filed: Apr. 1, 2022

(65) Prior Publication Data
US 2022/0224442 A1 Jul. 14, 2022

(51) Int. Cl.
*H04L 1/00* (2006.01)
*G06N 3/04* (2023.01)
*H04W 72/56* (2023.01)

(52) U.S. Cl.
CPC ............ *H04L 1/0083* (2013.01); *G06N 3/04* (2013.01); *H04L 1/0091* (2013.01); *H04W 72/56* (2023.01)

(58) Field of Classification Search
CPC ....... H04L 1/0083; H04L 1/0091; G06N 3/04; G06N 5/022; G06N 3/08; H04W 72/56
See application file for complete search history.

(56) References Cited

U.S. PATENT DOCUMENTS

| | | | | |
|---|---|---|---|---|
| 11,824,653 B2* | 11/2023 | Stoica | ................... | H04L 1/0041 |
| 11,934,365 B1* | 3/2024 | Mehta | ................... | G06F 16/215 |
| 12,183,326 B2* | 12/2024 | Xu | ........................ | G10L 15/08 |
| 12,284,036 B2* | 4/2025 | He | ....................... | H04L 1/0009 |
| 12,299,396 B2* | 5/2025 | Avhad | .................. | G06F 40/289 |
| 2022/0245422 A1* | 8/2022 | Wu | ........................ | G06N 3/045 |

OTHER PUBLICATIONS

C. Raymond, F. Bechet, N. Camelin, R. De Mori and G. Damnati, "Semantic interpretation with error correction," Proceedings. (ICASSP '05). IEEE International Conference on Acoustics, Speech, and Signal Processing, 2005., Philadelphia, PA, USA, 2005, pp. I/29-I/32 vol. 1 (Year: 2005).*

* cited by examiner

*Primary Examiner* — Justin R Knapp
(74) *Attorney, Agent, or Firm* — Schwegman Lundberg & Woessner, P.A.

(57) ABSTRACT

System and techniques for semantic network data correction are described herein. Semantic data corresponding to a data stream may be received. Here, the semantic data is based on the data stream. The data stream, including packets, is received. At least one packet has an error due to transmission via a network link. This error introduces an ambiguity for content of the packet. The error is corrected using the semantic data. The semantic data providing a constraint on the ambiguity to eliminate possible corrections for the error.

24 Claims, 12 Drawing Sheets

SEMANTIC NETWORK DATA CORRECTION

TECHNICAL FIELD

Embodiments described herein generally relate to computer networking and more specifically to semantic network data correction.

BACKGROUND

Computer network communications involve the transmission of bits over a medium. Modern computer network communications include several techniques to address the corruption of a signal in transmission, whereby the bits sent cannot be decoded without error at the receiver. Such techniques include error correction codes, parity bits, or manipulation of signal encoding or of the medium in order to enable detection or correction of the errors by the receiver. Such techniques find special use in wireless connection media but are also used in wired connection media.

Wireless communications in next-generation networks, such as cellular communications in compliance with a Third Generation Partnership Project (3GPP) family of standards, continue to experience growing demand to transfer more information per second. While fifth generation cellular (5G) is still in its infancy, there has been an increased shift in the research community to communication technologies beyond 5G and for sixth generation cellular (6G) networks. Academia, industry, and standardization bodies are already working on identifying candidate key performance indicators (KPIs) for future 6G services, use cases, or applications.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
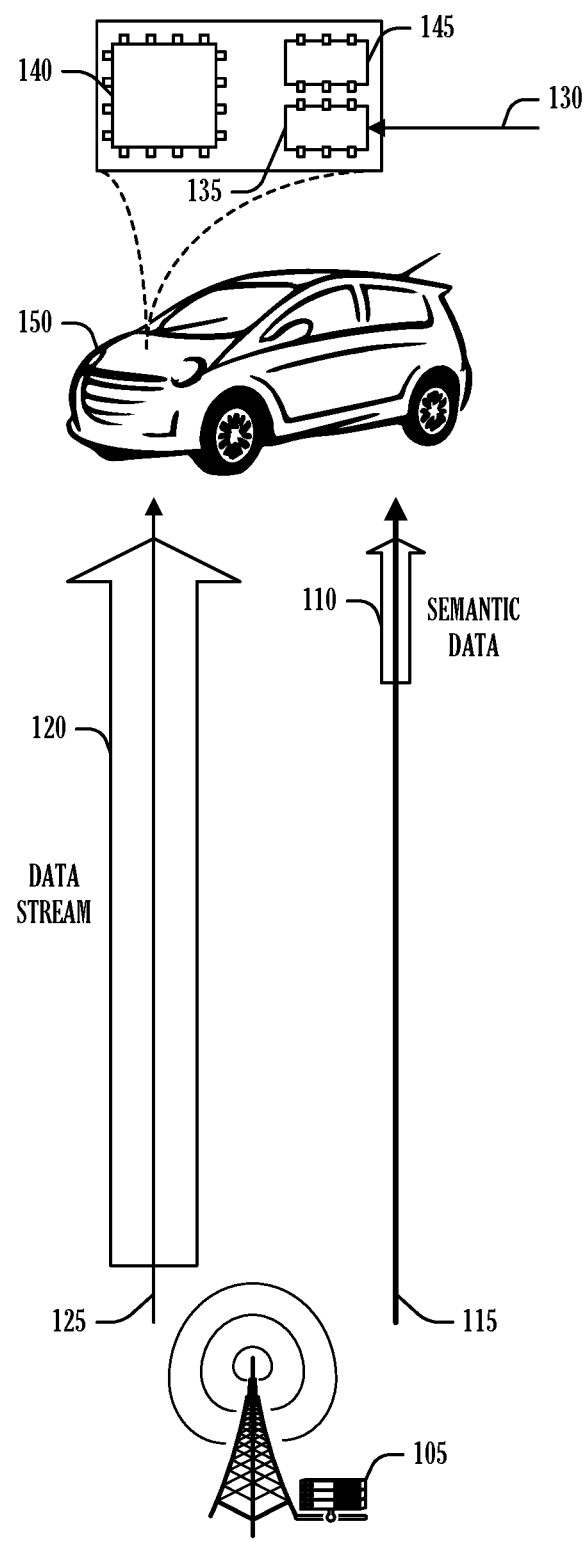
FIG. 1 is a block diagram of an example of an environment including a system for semantic network data correction, according to an embodiment.

Future 6G services and use cases—such as virtual reality (VR), mixed reality (MR), Holographic communications, multi-sense including haptic, or communication services—are expected to require 100 times more throughput and a tenth of the latency as 5G offerings. Some tentative key performance indicator (KPI) values for 6G are illustrated in the table below.

| KPI | 5G | 6G |
| --- | --- | --- |
| Traffic Capacity | 10 Mbps/m2 | ~1-10 Gbps/m3 |
| Data Rate Down Link (DL) | 20 Gbps | 1 Tbps |
| Data Rate Up Link (UL) | 10 Gbps | 1 Tbps |
| Uniform User Experience | 50 Mbps 2D everywhere | 10 Gbps 3D everywhere |
| Mobility | 500 Km/h | 1000 Km/h |
| Latency (radio interface) | 1 msec | 0.1 msec |
| Jitter | NS | 1 μsec |
| Communication Reliability | 1-10-5 | 1-10-9 |
| Inference Reliability | NS | TBD |
| Energy/bit | NS | 1 pJ/bit |
| Energy/goal | NS | TBD |
| Localization Precision | 10 cm on 2D | 1 cm on 3D |

As noted above, wireless signals may encounter various issues. These issues may include limited tower or cell capacity, wireless interferences, congestion, changing weather conditions, etc. Typically, some redundancy (e.g., bits, symbols, codes, etc.) is added to the message using encoding techniques for reliable reception of information. However, as error rates increase reconstruction becomes more difficult. For example, adaptive coding uses a variable coding rate to alleviate impairments from propagation conditions. Adaptive coding adds bits to the data. Adding more bits increases overall transmitted information. Not only is latency added, but more bandwidth is used to transfer the same information. If a signal cannot be reconstructed (e.g., errors corrected) then it is retransmitted. Retransmission further increases latency, bandwidth consumption, and power consumption. This may imperil stringent use cases, such as Advanced Driver Assist Systems (ADAS) lane changing—or other time-sensitive ADAS operations with similar strict latency or throughput requirements.

In general, current computer networks do not operate on or use the meaning embedded in the information transmitted. Accordingly, these networks do not have a mechanism to differentiate operation based on the relative importance of the data. Rather, the networks operate on static information—such as static priorities defined by 3GPP at flow level—based on a fixed taxonomy for enumerating traffic characteristics or attributes. These priorities are then used to treat traffic differently. Although some differentiation across different usages may be obtained by relying on such static information or priorities, the complex domain and context sensitive traffic handling requirements in the emerging 6G usages imply fine-grained situational adaptation—e.g., beyond the traffic shaping and coding informed by the static priorities—that is not possible with traditional priority marking techniques. For example, 6G may involve data flows with same priorities requiring different prioritized handling based on situation criticality. The existing 3GPP specification does not make a provision for flows of identical 3GPP priority that merit different handling for any reason. Thus, these flows cannot be (tied to a context or implication, such as prioritizing the data processing of an assisted visually impaired driver data processing over a fully sighted driver even when the 3GPP cellular flows are setup with the same priority in the network.

Another example of 6G usages that are not met by existing priority techniques involves dynamic use cases. Static preassigned priorities cannot distinguish between the needs of various dynamic use cases where such needs are scene based and vary significantly depending on the use case. For example, the static priority may treat all packets of a video stream the same. However, packets with facial expressions may be more important for a given application—such as determining whether the driver is paying attention or falling asleep—than other packets in the flow. It would be beneficial to give these more important packets priority based on this semantic importance. However, in most network packet processing pipelines, all packets for a given use case have the same statically defined priority. There is usually no way to discriminate what packets, or string of packets, at a given time should be treated as critical. Thus, there is no present technique to merit faster (e.g., prioritized) processing of these critical packets while providing remaining packets in the same flow normal (e.g., default) priority processing. Being able to implement such discrimination to base dynamic (e.g., timely and flexible) prioritization would be useful in various scenarios. Examples of these scenarios includes several use-cases, such as medical interventions, ADAS, telecontrol, selective duplication in bandwidth constrained scenarios, or sparse file packet handling, among others.

Three levels of communication have been identified in research. These levels include:
1. The transmission of symbols (called the technical problem);
2. The semantic exchange of transmitted symbols (called the semantic problem); and
3. The effect of semantic information exchange (called the effectiveness problem).

Until now, research has focused on the first level—the technical problem—with the second and third levels receiving little attention. As noted above, the use of adaptive coding or the like and the static priority schemes of cellular communication address the first level. However, in the time since this work, breakthroughs in artificial intelligence (AI) have combined with exponential increases communication demand. Now, semantic communication is becoming more important to enable a variety of new services and interconnecting humans and machines possessing various degrees of intelligence.

AI (e.g., machine learning, deep learning, etc.) has been used successfully for error correction or data reconstruction. However, current techniques suffer the "curse of dimensionality" for large input spaces. For example, using cellular code words, there are $2^k$ possible codewords for a code which uses k bits per message. A naively configured learning algorithm trains on noisy examples of all $2^k$ codewords in order to correct errors in those code words. Such a large training domain renders traditional AI techniques impractical for all but the shortest of message lengths. For example, when k=256 then $2^k$ on the order of the number of atoms in the Universe. In contrast, k=1723 in a low-density parity-check (LDPC) code for a ten Gigabit Ethernet network.

In the context of network error corrections, traditional AI approaches face several issues. For example, there is generally no structure codebooks. Thus, both the sender and the receiver must store all $2^k$ words in the codebook, which is often intractable from a space perspective in practical use cases. Also, decoding is known to be nondeterministic polynomial-time (NP) hard in general. Accordingly, computational complexity is significant, requiring more capable (e.g., power hungry or expensive) hardware that may impact stringent use cases such as ADAS lane changes among others.

In review, existing techniques, such as turbo codes, adaptive coding, etc. cannot always reconstruct a noisy signal at the receiver. Hence, these techniques may require retransmission. Stringent use-cases have strict latency or throughput needs among other requirements, which go unmet when data reconstruction fails and forces retransmissions. AI based reconstruction and correction at the receiver end suffers from the curse of dimensionality, in which practical implementations are hampered by the sheer size of the training domain and an artificial neural network to support it. These issues impact raw data throughput, which may be addressed, in some contexts, by flexible prioritization of data—for example, to use less error prone physical channels (e.g., media) for important data—that is generally absent from current networks. In general, there is no provision for dynamic prioritization of data flows based on real-time use cases beyond traffic characteristics in current networks. For example, there is no support for cases where flows with the same 3GPP priorities require differential traffic handling based on continuously changing states, scenes, scenarios, contexts etc. at run time.

To address the issues noted above, the systems and techniques described herein transmit semantic data along with a data stream. The semantic data is used to reconstruct errors in the data stream as well as provide flexible prioritization of some of all of the data stream even if the data is not read. The semantic data is compact and applies to a large number of bits, unlike trading error correction coding techniques. Thus, the semantic data provides an efficient mechanism that does not scale linearly with the noise on a channel or even the number of bits or code words in a data flow. Further, the semantic data may reduce the dimensionality problem of current AI error correction, enabling practical AI implementations to address noisy data. These features combine to overcome the gaps and limitations of current technologies to address requirements and opportunities identified above where use of semantic information stands to improve next generation networks.

The various approaches of current networks to reduce noise or interference through coding adds more overhead for more important (prioritized) flows in order to survive or recover from higher bit error rates. With semantic network data correction, such coding approaches are augmented with granular decisions to control the amount of bit overhead by capitalizing on context and semantic information. To illustrate the concept, consider a communication on a medical topic that includes a complex term such as the Lambert-Eaton syndrome (LES). Assume that the channel becomes noisy and a message that contains multiple such terms and various other information is garbled in transit and is only partially corrected at the receiver due to insufficient error bit budget. Here, the error bit budget refers to a number of excess bits that may be dedicated to error correction. Accordingly, if ten bits are needed to correct an error but the bit budget is eight, then then the error bit budget is insufficient. Thus, at the receiver, the term appears as LZT instead of LES. Using the semantic data, the receiver classifies the communication in the context of auto-immune disorders, enabling an expert system application to propose LES as a highly likely correction to LZT.

Generally, error correction at the physical level in the transport mechanism and stack, and the error correction at the application (e.g., semantic) level are decoupled. However, with semantic network data correction, these aspects are merged by extracting semantic information (e.g., including context) by a sender and used to guide the transport mechanisms to prioritize and reconstruct corrupted data. Accordingly, the fraction of information that has specialized content—such as special terms, important segments in an image, etc.—may be flagged and covered by a focused error correction budget (e.g., error bit budget). Other traffic (e.g., generic content) that may be recovered by domain agnostic correction algorithms is given the baseline error correction budget. Further, the error correction budget may be re-allocated as needed to data flow portions that convey more densely represented semantic information from baseline content.

In addition to shaping the error correction bit budget, the semantic information (e.g., including context) also may be used to shape the choice of resiliency and redundancy mechanisms employed. For example, some portions of information may be dynamically assigned higher classes of service in order to meet an overall high level of accuracy without assigning the same high class of service to low value or less ambiguity prone parts of the communication. Accordingly, semantic information is extracted and used to produce more targeted interpretations of ambiguous or error-mixed information. This enables reconstruction of the original information from the noise-affected packets reaching a receiver. In an example, the semantic information is transmitted on a separate channel or with greater hardening (e.g., fewer bits per code word, a greater error bit budget, etc.) against noise. For example, a secondary channel with low error rates may be established by selecting an appropriate frequency range or suitable band for transmission of semantic information based on use case, bit rate, signal-to-noise ratio (SNR), etc. Here, scene based, or use-case based semantic information may be generated and transmitted on the secondary channel, which is a different channel than that carrying the data. At the receiver, a semantic pipeline is employed and is different than traditional packet pipelines for efficient and immediate treatment of transmitted packets.

Using the systems and techniques described herein resolves the 'curse of dimensionality' issue for efficient and timely reconstruction of information in AI-based correction or re-construction by narrowing the feature set. This also improves accuracy because related data may be identified using the semantic information. Further, computational effort and energy are saved. These systems and techniques also reduce network congestion due to retransmissions via the more effective data error correction. Further, a semantic network—as opposed to packet processing network—enables the network itself to change operations based on the semantic information, for example, to implement semantic priorities. Thus, the network may assign dynamic semantic properties to packet data within or across data flows having the same 3GPP priority, for example. This may help the network to provide dedicated prioritized processing to required packets within flows. Thus, multiple flows having the same 3GPP priority may use dynamic semantic information for identifying and prioritizing one flow over other ones according to the needs of the use case and semantic information provided or learned for the scenario. Additional details and examples are provided below.

FIG. 1 is a block diagram of an example of an environment including a system for semantic network data correction, according to an embodiment. The system includes a receiver 150—illustrated a vehicle—that includes processing circuitry 140 and a memory 145, for example, in a navigation or ADAS device in the vehicle. The receiver 150 also includes a network interface 135 (e.g., radio) to receive data transmission on a medium 130. As illustrated, the medium 130 is wireless (e.g., certain frequency ranges), but may be wired in other contexts.

The sender 105 (e.g., transmitter) also includes processing circuitry, a memory, and a network interface. As illustrated, the sender 105 is a cellular base station (e.g., a gNodeB in accordance with the 3GPP 5G nomenclature), however any sender of data may be used in this role. Again, the transmissions of the sender 105 may be wired or wireless depending on the specific use case.

The data stream 120 includes the data being transferred from the sender 105 to the receiver 150 on a first channel 125. In the illustrated example, the semantic data 110 is transmitted on a second channel 115. The difference line weight between the first channel 125 and the second channel 115 illustrates the resistance to noise that the second channel 115 has over the first channel 125 in this example. From the illustration, it is clear that the semantic data 110 is much smaller than the data stream 120 to which the semantic data 110 applies. Thus, additional overhead involved with using the more robust second channel 115 is proportionally much smaller for sending the semantic data 110 than the data stream 120.

At the receiver 150, the processing circuitry 140 is configured to receive—for example, from the network interface 135—the semantic data 110 corresponding to the data stream 120. The correspondence of the semantic data 110 to the data stream 120 is based on deriving the semantic data 110 from the data stream 120 by, for example, the sender 105 or by an originator of the data in the data stream 120. Thus, for example, the semantic data 110 may include contextual information for sensor capture of an accident by another vehicle, or features extracted from a video, among other things.

The processing circuitry 140 is also configured to receive—for example from the network interface 135—the data stream 120. In an example, the data stream 120 is made up of packets (e.g., the data stream 120 is packetized). In an example, bits of the data stream 120, including packet bits, such as headers, are physically transmitted over the first channel 125 in code words, such as is used in phase-shift keying (PSK), frequency-shift keying (FSK), amplitude-shift keying (ASK), or quadrature amplitude modulation (QAM) modulation techniques.

The data stream 120 for the following examples includes an error introduced in transit, such as by noise in the first channel 125, or another network link. This error introduces an ambiguity with respect to the packet content. For example, given a QAM constellation diagram, a variation in phase or amplitude introduced by the first channel 125 may place the received phase and frequency between two or more codes rather than the single intended code word. At higher coding densities, such as in 256QAM (where each constellation point represents 256 bits) versus 4 QAM (where each constellation point represents four bits, enabling greater separation between the constellation points and thus less ambiguity). Other ambiguities may include a change in characters, for example, such as that described above with respect to LES and the autoimmune example.

Again, as illustrated, the semantic data 110 is received on the second network channel 115 and the data stream 120 is received on the first network channel 125. However, in an example, the semantic data 110 transmitted on the first network channel 125, for example, before the data stream 120 is sent. In an example, the second network channel 115 has a higher SNR than the first network channel 125. In an example, the higher SNR is achieved by a coding technique. The coding technique involves a greater number of error correction bits (e.g., turbo code, parity, etc.) being used to encode the transmissions on the second channel 115. However, the second channel 115 may also be more robust without the additional coding techniques or may use a combination of a more robust physical link and the coding techniques. An example of a more robust physical link may include identifying frequencies with less interference—either because of intrinsic frequency characteristics or because there are fewer transmissions at those frequencies—and using those frequencies. In any case, in these examples, the second channel 115 has a greater likelihood of transmitting the semantic data 110 without retransmission (illustrated by the thicker line for the second channel 115). Again, such overhead in coding (e.g., additional bits) or in channel selection is small given the small size of the semantic information 110 relative to the data stream 120.

Once the semantic data 110 is received, the processing circuitry 140 is configured to use the semantic data 110 to correct the error in the data stream 120. As noted above, the error introduced an ambiguity into an interruption of data received. The semantic data 110 provides a constraint on the ambiguity to eliminate erroneous interpretations of the error by the processing circuitry 140. For example, assume that the original transmission intended to transmit a letter grade of C, where letter grades may be A-F and the encoding is ASCII. The received character is K. The semantic data 110 indicates that the transmission is of a latter grade, the range of possible grades, and the encoding. Thus, the intended bit sequence of 01000011 for C may be readily determined from the bit sequence of 01001011 for K because the bit at index four (starting at zero) is one, which violates the constraints of the semantic data 110 because all of the valid ASCII encoded letter grades have a prefix of 01000, varying only in the last three bits.

In an example, the semantic data 110 is applied to every packet in the data stream 120. This example follows the illustration that the semantic data 110 is small relative to the data stream 120. Often, the context, such as location, application, scenario, in which the data stream is produced applies to all data produced. Thus, for example, significant video, audio, or location data generated by sensors in a vehicle accident may be concisely contextualized. Such abbreviated semantic data 110 may be particularly effective when used as an input to an artificial neural network (e.g., ANN, neural network, etc.) along with the data stream 120. Thus, in an example, correcting the error using the semantic data 110 includes providing the semantic data 110 and the packet with the error from the data stream 120 to a neural network implemented by the processing circuitry 140. This neural network is trained to produce a correct version of the packet. The semantic data 110 addresses the dimensionality problem of such AI error correction by providing the constraints on ambiguities introduced by the error.

In an example, the error is corrected as each packet is received. In an example, the neural network is executed in an infrastructure processing unit (IPU) including the network interface 135 upon which the data stream is received. Example details about IPUs are provided below in the discussion of FIG. 8. In this example, the processing circuitry 140, the memory 145, and the network interface 135 are all included in the IPU. Thus, the data stream 120 is error corrected when used by a host processor or other device in the receiver 150.

As noted above, beyond correcting the error, the semantic data 110 may be used to treat portions of the data stream 120 differently based on their importance. Semantic information may include multiple levels of sub-information (e.g., defined by domain specific use cases). For example, a first level of sub-information may be the priority, a second level may be generalized semantic data for a situation (e.g., application, time, place, domain of problem, range of problem, etc.), and a third level of sub-information may be more specific (e.g., encoding, sensor that produced the data, etc.). Thus, in an example, correcting the error includes determining a first priority (e.g., a first level) for the packet and error domain specific semantic data (e.g., a second level) using the semantic data 110 and contents of the packet. The processing circuitry 140 may determine a second priority for a second packet using the semantic data 110 and contents of the second packet. The processing circuitry 140 is here configured to compare the first priority and the second priority to determine that the packet has a higher priority than the second packet. Then, the error is corrected in the packet before correcting a second error in the second packet based on the determination that the packet has the higher priority. Examples provided below also illustrate channel priority differences that may be employed on the semantic data without even reading the data stream 120.

In an example, the sender 105 is configured to extract the semantic data 110 from the data stream 120 before transmission. Thus, in an example, the sender 105 is configured to extract second semantic data from a second data stream, transmit the second semantic data to the receiver 150 receiving node, and transmit the second data stream to the receiving node 150. In an example, extracting the second semantic data from the second data stream includes providing the second data stream to another neural network trained to produce semantic data to create the second semantic data.

The above illustrate several details and examples of semantic network data correction. The following description illustrate some more details of various scenarios and the application of semantic network data correction.

Figure 2:
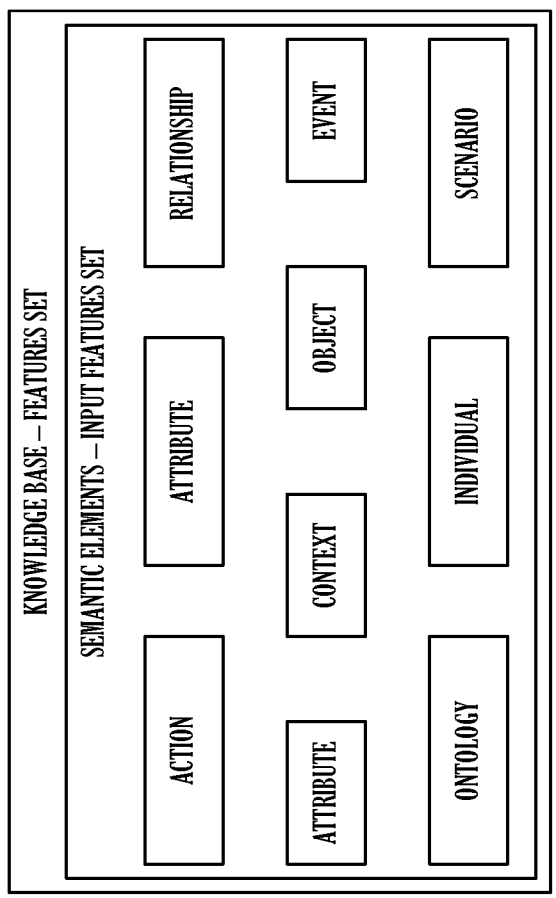
FIG. 2 illustrates an example of a semantic knowledge base, according to an embodiment.

FIG. 2 illustrates an example of a semantic knowledge base, according to an embodiment. Semantic information, such as the semantic data 110 illustrated in FIG. 1, may be understood at the endpoints via a knowledge base. As there is no global standard for a knowledge base to underpin semantic applications, the knowledge base, depicted on the right is just a possible implementation of many. As illustrated, the knowledge base includes semantic elements, or input feature set. Examples of the semantic elements may include Action, Attribute, Relationship, Context, Object, Event, Ontology, Individual, or Scenario. An Action is a situation with a semantic meaning (e.g., represented by a verb) that is happening in a scene typically related to Objects. Here, the objects may be either the subjects or the objects of the Action. An Intransitive Action expresses status of Objects. A Transitive Action may be naturally treated as triples (e.g., an n-tuple where n is three) including a subject, a predicate, and an object.

An Attribute is a quality or feature of a class element or axiom of an ontology. An Axiom (e.g., Relationship) in a particular domain, are one or more statements that are asserted to be true. Axioms may structure the ontology. A Context is a class for elements that describe the general situation or circumstances of a scenario. Contextualizing may involve any aspect that helps a receiver to define surroundings or general conditions of the scenario. An Event is a class that represents anything that happens in a time period (e.g., frame). Generally, the start and end of the time period are predefined by, for example, a first action and a second action, or simply a set period of time starting at a first detection that meets predefined criteria. For example, when a collision sensor in a vehicle is activated, the time period may begin and end five minutes later, or when the vehicle is sensed to be moving again (e.g., either under its own power or being towed).

An Individual is an instance of an ontology class. Generally, a named class should be assigned to each individual entity of any scene. Hence, individuals of a class may be defined by a unique identifier (UID) or a unique name that is specific to each analyzed case (e.g., scenario). An Object is a class that may be used to represent anything with individual properties. Examples may include a person, a thing, a data structure, etc. An Ontology is a formal machine comprehensible description of concepts (e.g., a class) and their relations (e.g., axioms) according to a common understanding of experts in the domain. Thus, an Ontology is a definition of acceptable interactions (e.g., constraints) on things in a domain. A Scenario is a quantitative and qualitative description of a situation, such as a traffic environment. The Scenario may comprise a sequence of Actions and Events performed by Objects. Other embodiments of a knowledge base may contain fewer or additional elements and may organize them into various hierarchies of elements.

Figure 3:
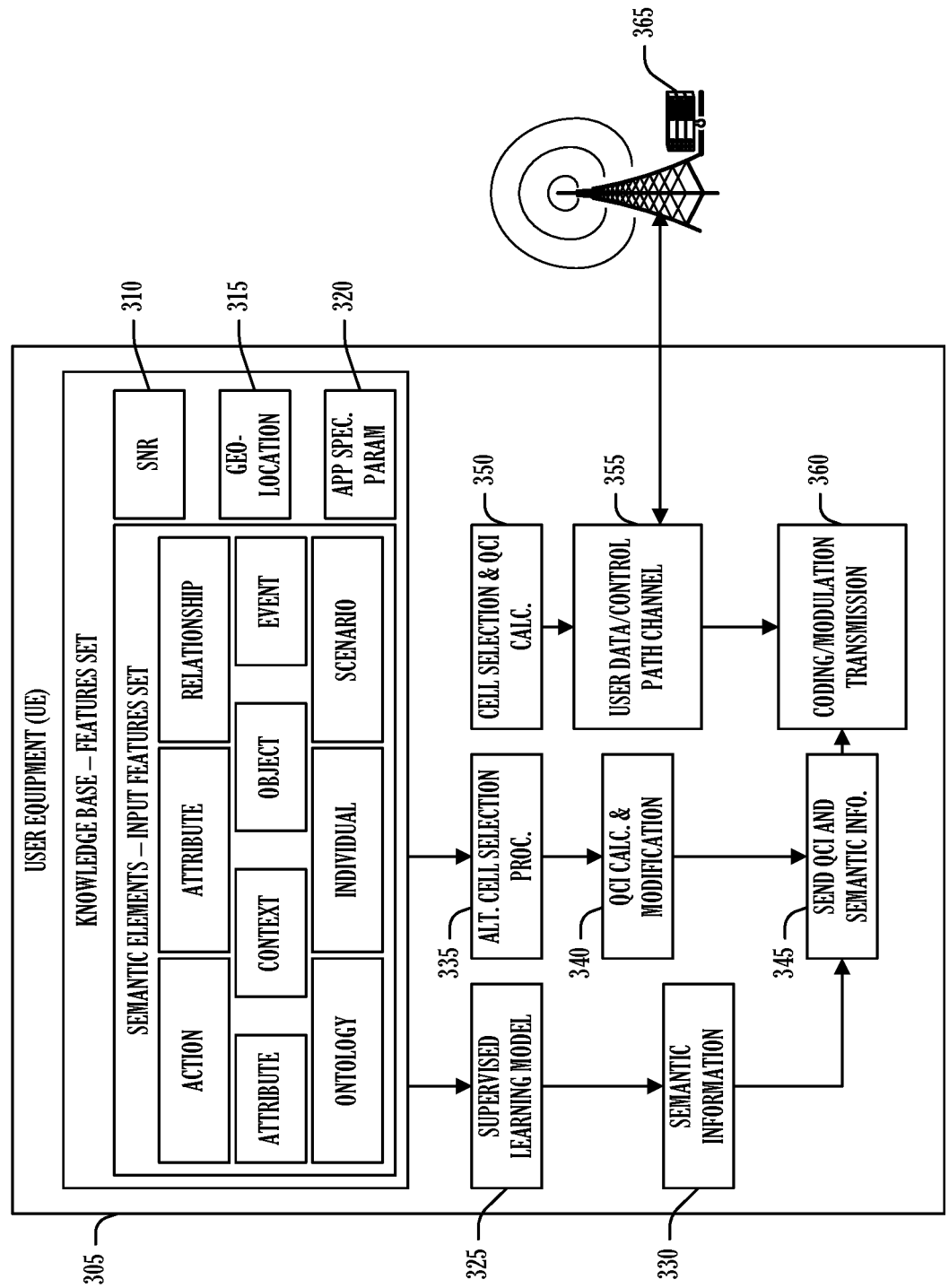
FIG. 3 illustrates an example of a user equipment (UE) using semantic network data correction, according to an embodiment.

FIG. 3 illustrates an example of a user equipment (UE) 305 using semantic network data correction, according to an embodiment. In the illustrated example, the UE 305 uses a pre-shared knowledge base (described above), possibly along with other inputs—such as SNR 310, geographic location co-ordinates 315, or application use-case specific parameters 320 (e.g., latency, jitter, bit rate, scene information etc.)—to one or more supervised learning models 325 to obtain related semantic information 330.

The UE 305 may derive channel or quality of service (QOS) class identifiers (QCI) mapping from the semantic information 330. For example, the UE 305 may check available cells 335, such as the capacity or SNR of these cells. In 5G, the UE 305 may further check three available frequency spectrums (e.g., low-band, mid-band, or high-band). This information is sent along with required QCI (quality channel indicator) 340 as alternate channel to the transmission coding 360 along with the cell selection 350 and control 355 received from the base station 365. Accordingly, the UE 305 may choose a primary cell for a first channel for packet data transfer using standard techniques and choose a secondary cell based on other factors. These other factors may be cell capacity of the first cell, a first channel frequency spectrum, a sub-band allocation within the spectrum, an SNR 310 of all available frequency spectrums, etc. The UE 305 may check the SNR 310 of available spectrums and use the SNR 310 as the basis to select an appropriate spectrum or frequency sub-band for the alternate channel. Here, appropriate choices may include ensuring a higher throughput or a higher SNR than the first data or control channel spectrum. In general, a higher frequency results in greater data transmission. Accordingly, a higher frequency sub-band is usually more appropriate when both the first and secondary (e.g., alternate) cells are within the same frequency spectrum. As noted above, packets are transferred along with related semantic information to base station 365 (e.g., a gNodeB).

Figure 4:
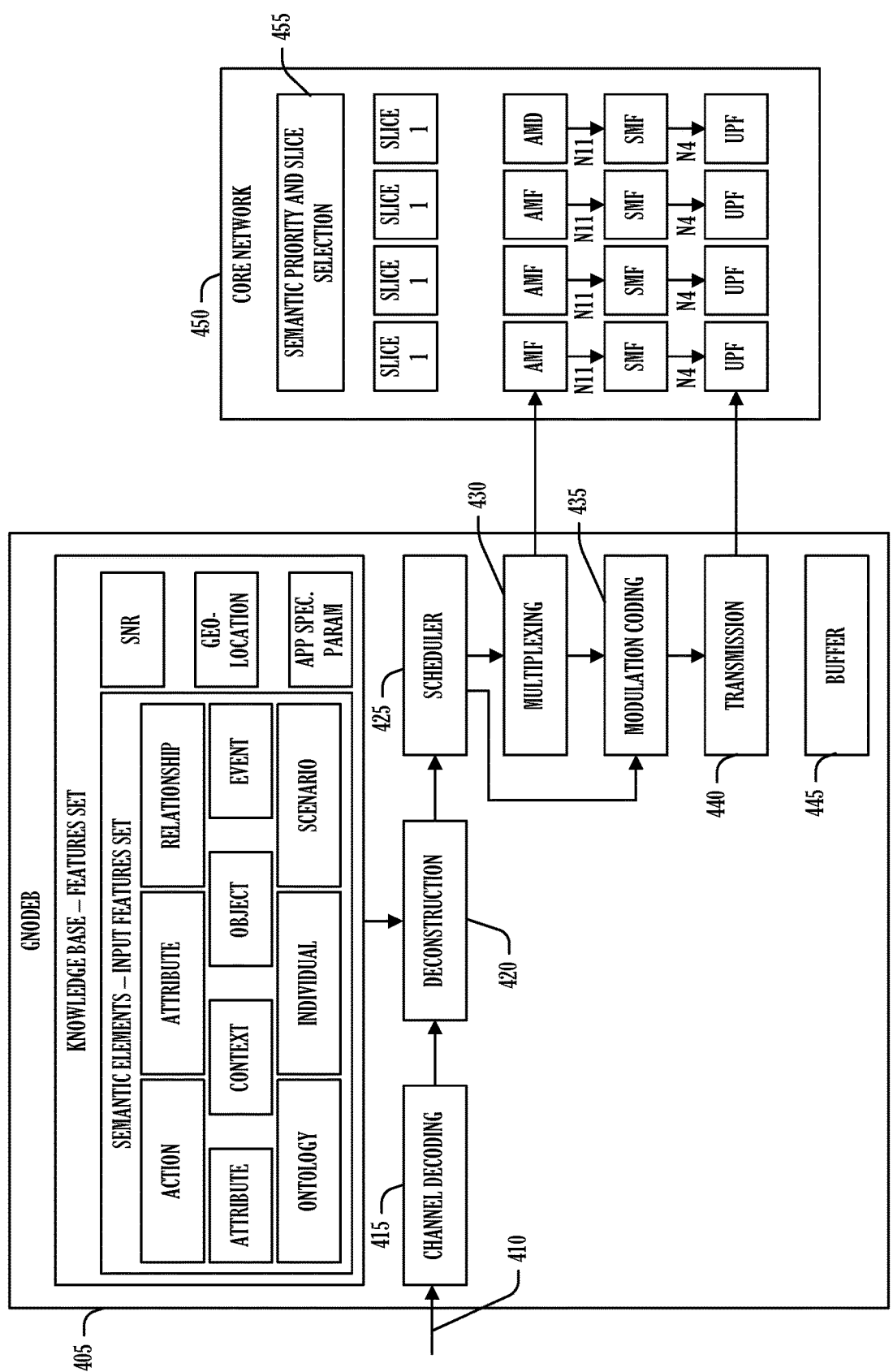
FIG. 4 illustrates an example of a base station using semantic network data correction, according to an embodiment.
Figure 5:
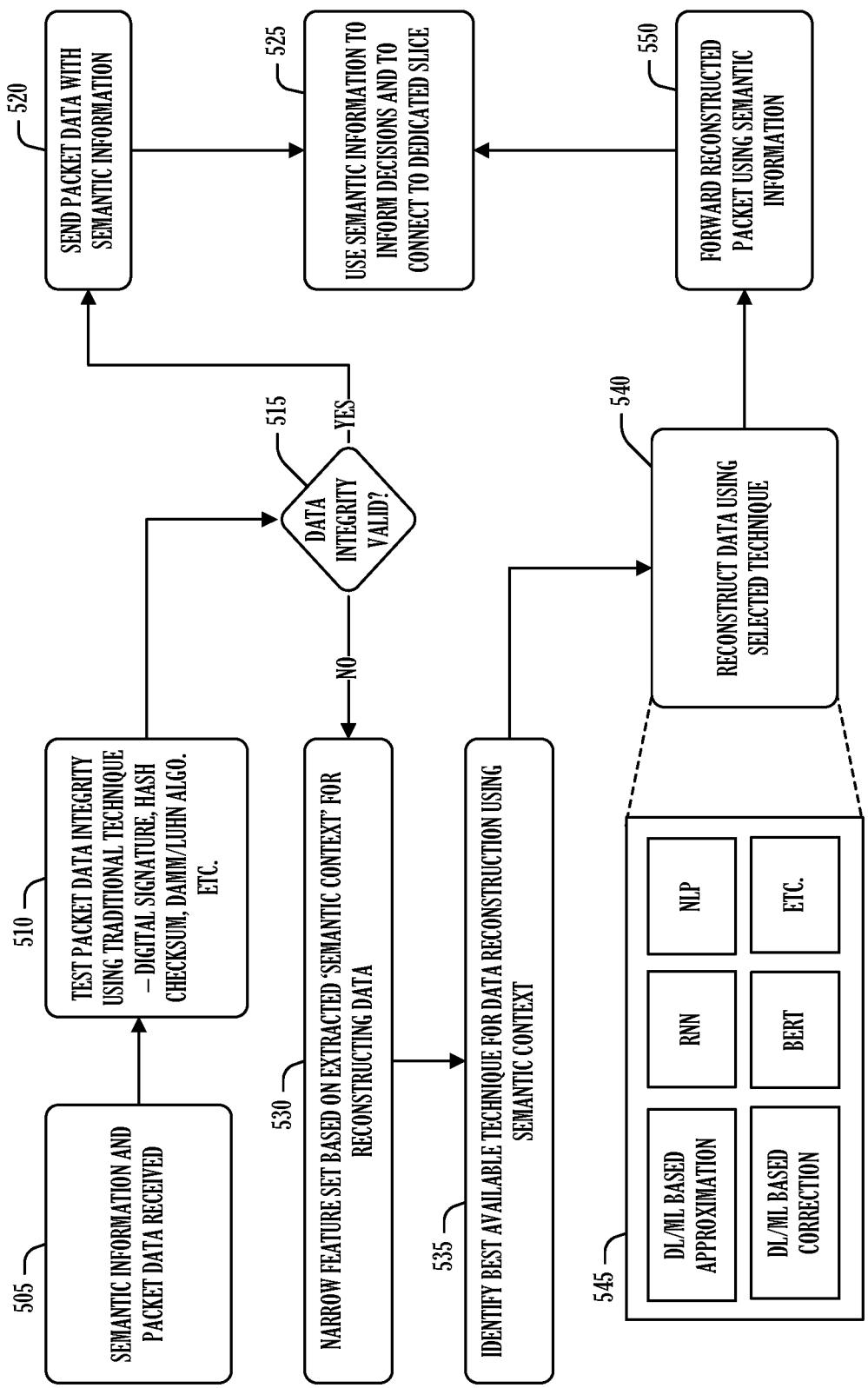
FIG. 5 illustrates an example of network data correction using semantic data, according to an embodiment.

FIG. 4 illustrates an example of a base station 405 using semantic network data correction, according to an embodiment. Following the transmission of information from the UE 305 illustrated in FIG. 3, the base station 365 may operate as follows to reconstruct the information. For example, the base station 405 decodes data 415 from an input medium 410 (e.g., radio channel). Thus, the base station 405 receives first and alternate channel QCI indicators, packet data, and corresponding semantic information along. The base station also has the shared knowledge base—previously shared with a UE at setup time—that serves to guide the decoding and extraction 420 (e.g., deconstruction) of semantic information from received packets. Based on extracted semantic information, the received signal is corrected (e.g., reconstructed) and a radio access network (RAN) slice may be chosen, for example, by the scheduler 425. An example of a reconstruction process is illustrated in FIG. 5.

In general, the semantic information is extracted and validity checks for data integrity are conducted. If the semantic information is invalid, AI prediction or error correction may be used to reconstruct the semantic information. Generally, the semantic information is transferred using a stronger signal encoding or in a higher frequency band channel, with provisions for a higher SNR than the normal or baseline 'packet data' channel to reduce the likelihood of corruption of the semantic information well below that of the baseline packet. In the case of data corruption, the semantic information is often easier to recover because it conforms to a predefined semantic-element-input feature set having lower dimensionality than that used in a smaller alphabet, for example.

Packet information may be extracted and a classic data integrity test may be performed. If the data integrity test passes, then the packet moves on. If the data integrity check fails, then the packet will be reconstructed. Depending on the use-case, transmitted semantic information may include one or more parameters that may be used for different purposes on receiver side. For example, a primary semantic parameter may represent a current application state, a use-case, scene information, a scenario, etc. The primary semantic parameter may be used to determine and extract a related data set for reconstruction of received data. Further, the primary semantic parameter may narrow the feature set substantially, enabling a focus on the most cognate and applicable elements of the feature set. A secondary semantic parameter may represent the priority on which to process data in the pipeline.

Figure 6:
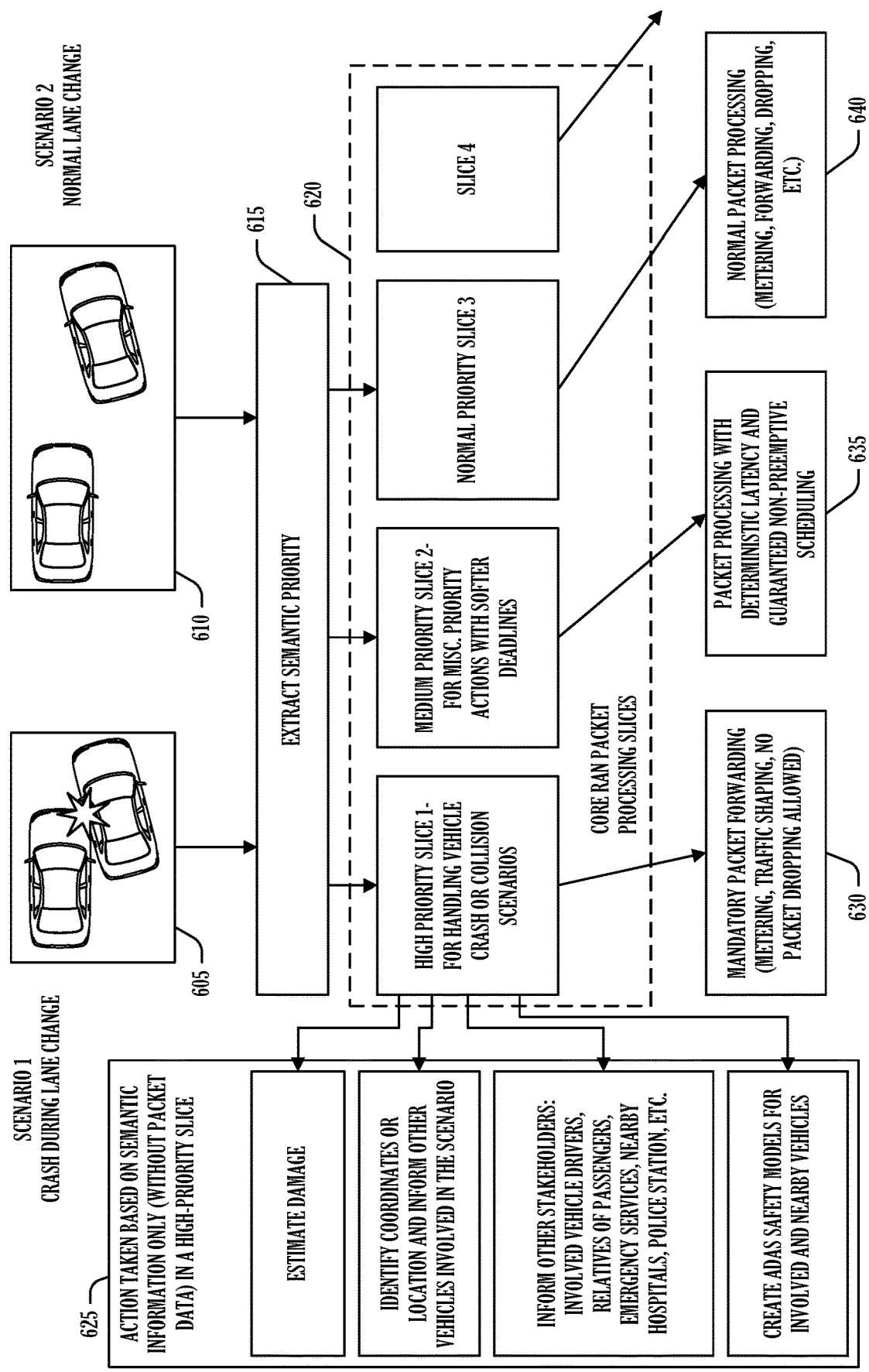
FIG. 6 illustrates an example of network slice handling using semantic data, according to an embodiment.

The base station 405 may then transfer the above semantic information along with packet data to the network core 450, for example, multiplexing 430 the semantic information and the packet data, coding the data 435 and transmitting 440 the data. The buffer 445 may be used to address an inability to transmit 440 when the data is ready. In the network core 450, based on the semantic information, packet data is handled in a differentiated manner. In an example, the underlying use case dictates the different and available packet handling techniques. Examples of differentiated packet handling may include the choice of its network slice 455, processing, routing, etc. FIG. 6 illustrates a lane change use case in which two different scenarios, both having the same 3GPP priority, are treated differently.

FIG. 5 illustrates an example of network data correction using semantic data, according to an embodiment. The illustrated example uses an autonomous (e.g., driverless) vehicle encountering an unclear stop sign, or TSR (Traffic signal recognition). Using standard visual sensing and down link (DL) inference and semantic contextual information, a driverless vehicle may mimic a human driver's ability to infer that what it is seeing is a STOP sign even when the actual letters are hard to discern due to lighting conditions, rain, or vandalism, for example.

As illustrated, semantic data is received along with packet data (operation 505). An integrity check on the received data is performed (operation 510) top detect errors. If the data is valid (decision 515), the semantic data is sent (operation 520) to be used to inform processing decisions (operation 525) for the packet data. However, if the data is invalid (decision 515), the semantic data is extracted (operation 530) and used to identify a reconstruction tool from a set of tools 545) that is most likely to correct the packet data. The identified tool is then used to reconstruct the packet data 540. Once the reconstruction is complete, the corrected packet data is provided along with the semantic data to inform processing decisions of the packet data (operation 525).

The contextual information in the semantic data reduces signal decoding and interpretation time while also providing faster and more accurate data reconstruction. In addition, the semantic data helps to ensure proper QOS values. For example, assuming that the visual processing has detected "Traffic Sign" and "Red Color," and passed these as contextual parameters. Upon reception of the first parameter "Traffic Sign", a receiver may locate applicable feature sets—such as a feature set containing only traffic sign features—and use techniques specific to these feature sets to reconstruct the packet data. Reconstruction time is reduced drastically as the receiver locates and executes a feature set that is directly relevant to transmitted data. The secondary parameter "Red" may be translated by a model (e.g., AI model), to direct that the signal is sent with a higher QOS for priority signal handling on the network. By way of illustrating the contrast: when a patrol station traffic sign with some other color, such as blue is detected, the QOS recommendation may have a lower priority than that for "Red".

FIG. 5 illustrates an example of network slice handling using semantic data, according to an embodiment. Illustrated is an ADAS lane change use case with two scenarios, a collision scenario 605 and a normal scenario 610. In these scenarios, packets have been assigned same priority (as per the 3GPP specification) but devices involved in scenarios generate packets with different semantic significance based on real time use-case change (e.g., the collision of the crash scenario 605 in contrast to the normal operation of the normal scenario 610). The processing is prioritized differently in view of their relative significance. A semantic generator 615 provides semantic information that flows alongside packet data. For example, in the crash scenario 605, a crash is detected during a lane change. This immediately triggers a semantic information change and a semantic priority change in the packet data flowing from all devices involved in the crash scenario 605. Based on the semantic information or the semantic priority, SLICE 1 is chosen by the network 620 for packet processing. SLICE 1 processes the semantic information and the packet data at very high priority levels, assigning dedicated resources for processing. Based on semantic information, application or other supporting logic may calculate overall damage, inform various stakeholders—such as hospitals, police stations, emergency services, other vehicles on the same route—to trigger (e.g., activate) safety models for involved vehicles.

These actions 625 may be taken solely based on the semantic information. That is, the network 620 need not decode or consult the packet data in order to perform these actions 625.

SLICE 1 packet processing may be contrasted to that of SLICE 2, which is assigned for the typical case of the normal scenario 610. In SLICE 1, optional actions like packet metering, shaping and dropping may be entirely suspended (operating parameters 630) because, in the event of an emergency, it is prudent to treat all information as high value and not drop any packets. SLICE 2 enables more flexible operating parameters (operating parameters 635) than SLICE 1, but there are a few restrictions to address the rigors of ADAS. In contrast, SLICE 3 operating parameters 640 provide greater flexibility to increase network efficiency, for example.

The semantic network data correction described herein provides a framework for a receiver to use semantic information to efficiently correct data errors (e.g., with a high bit error rate (BER)) in high noise environments. Generation of appropriate semantic information enables discriminating scenarios, use-case state, or context for a data stream. Semantic information may contain one or more parameters. The semantic information may be communicated on a secondary channel—to the primary channel the data stream is sent upon—with low error rates by selecting appropriate frequency ranges or a suitable band for transmission of semantic information. The secondary channel selection may be based on use case, latency, throughput, bit rate, SNR, etc.

A receiver (e.g., receiving node) operates on the semantic pipeline in addition to, rather than only with, a traditional packet processing pipeline for efficient and immediate treatment of the packets received. The receiver may use semantic parameters to locate applicable feature sets for widely used AI techniques to reconstruct a signal. The receiver may discriminate, mark, and process packets based on the semantic information depicting real time use-case scenarios. For example, the receiver may use a dedicated slice based on semantic information for faster processing of discriminated packets. In another example, the receiver may use semantic parameters to determine a QOS processing level or take further actions—such as bypassing metering, avoid packet dropping, avoid shaping operations, etc.—for data marked indicated by the semantic information as having a certain criticality. Accordingly, network flows having the same 3GPP priorities may be handled with different priorities based on real time situation criticality. For example, high priority (e.g., safety-critical) content, as discriminated by the semantic information (e.g., including use-case specific dynamic state such as a crash event in ADAS lane change example), may be assigned to a slice with differentiated scheduling (e.g., real-time, high priority, etc.) with optional network operations (e.g., monitoring) suppressed in the interest of urgency.

In an example, when bandwidth available is limited, and it is difficult to provide sufficient error correction budget, packets may be graded in value according to the information that they contain based on the semantic data. Packets with low information value may be deprioritized in the bandwidth and error correction budgets they receive to free up sufficient bandwidth budget for higher priority information. In an example, if the application software provides an optional "interpolation/extrapolation" interface at the sender, then lower priority packets may be sent to such an interface, the sender logic behind such an interface may translate packets into very compact codes, which are then piggybacked on alternate packets. When actual data packet is found missing, the codes in the alternate packet signal to the receiver how a missing packet may be inferred by interpolation between surrounding packets, or by extrapolation from previous N packets. This may be done when content is interpolation/extrapolation amenable, such as video frames, or speech packets in which missing information may be filled in by a receiver side processing circuitry based on guidance from the sender side. In this case, the transport layer considers packets as not lost even when intermediate packets are dropped somewhere between the sender and the receiver.

Figure 7:
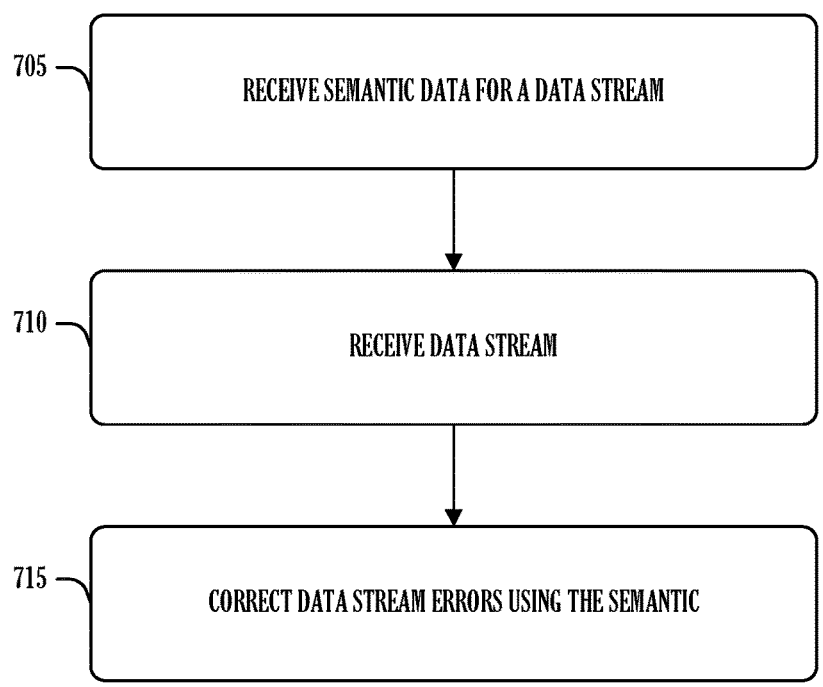
FIG. 7 illustrates a flow diagram of an example of a method for semantic network data correction, according to an embodiment.

FIG. 7 illustrates a flow diagram of an example of a method 700 for semantic network data correction, according to an embodiment. The operations of the method 700 are performed by computer hardware, such as that described above or below (e.g., processing circuitry).

At operation 705 semantic data corresponding to a data stream is obtained (e.g., retrieved or received). Here, the semantic data is based on the data stream.

At operation 710, the data stream is received. Here, the data stream is made up of packets that include an error due to transmission via a network link. In this case, the error introduces an ambiguity with respect to the packet content.

In an example, the semantic data is received from a first network channel and the data stream is received on a second network channel. In an example, the first network channel has a higher signal to noise ratio (SNR) than the second network channel. In an example, the higher SNR is achieved by a coding technique.

At operation 715, the error is corrected using the semantic data. Here, the semantic data provides a constraint on the ambiguity to eliminate erroneous interpretations of the error.

In an example, the semantic data is applied to every packet in the data stream. In an example, correcting the error using the semantic data includes providing the semantic data and the packet to a neural network. This neural network is trained to produce a correct version of the packet. In an example, the error is corrected as each packet is received. In an example, the neural network is executed in an infrastructure processing unit (IPU) including a network interface upon which the data stream is received.

In an example, correcting the error includes determining a first priority for the packet using the semantic data and contents of the packet, determining a second priority for a second packet using the semantic data and contents of the second packet, and comparing the first priority and the second priority to determine that the packet has a higher priority. Then, the error is corrected in the packet before correcting a second error in the second packet based on the determination that the packet has the higher priority.

In an example, the operations of the method 700 include extracting second semantic data from a second data stream, transmitting the second semantic data to a receiving node, and transmitting the second data stream to the receiving node. In an example, extracting the second semantic data from the second data stream includes providing the second data stream to a neural network trained to produce semantic data to create the second semantic data.

Figure 8:
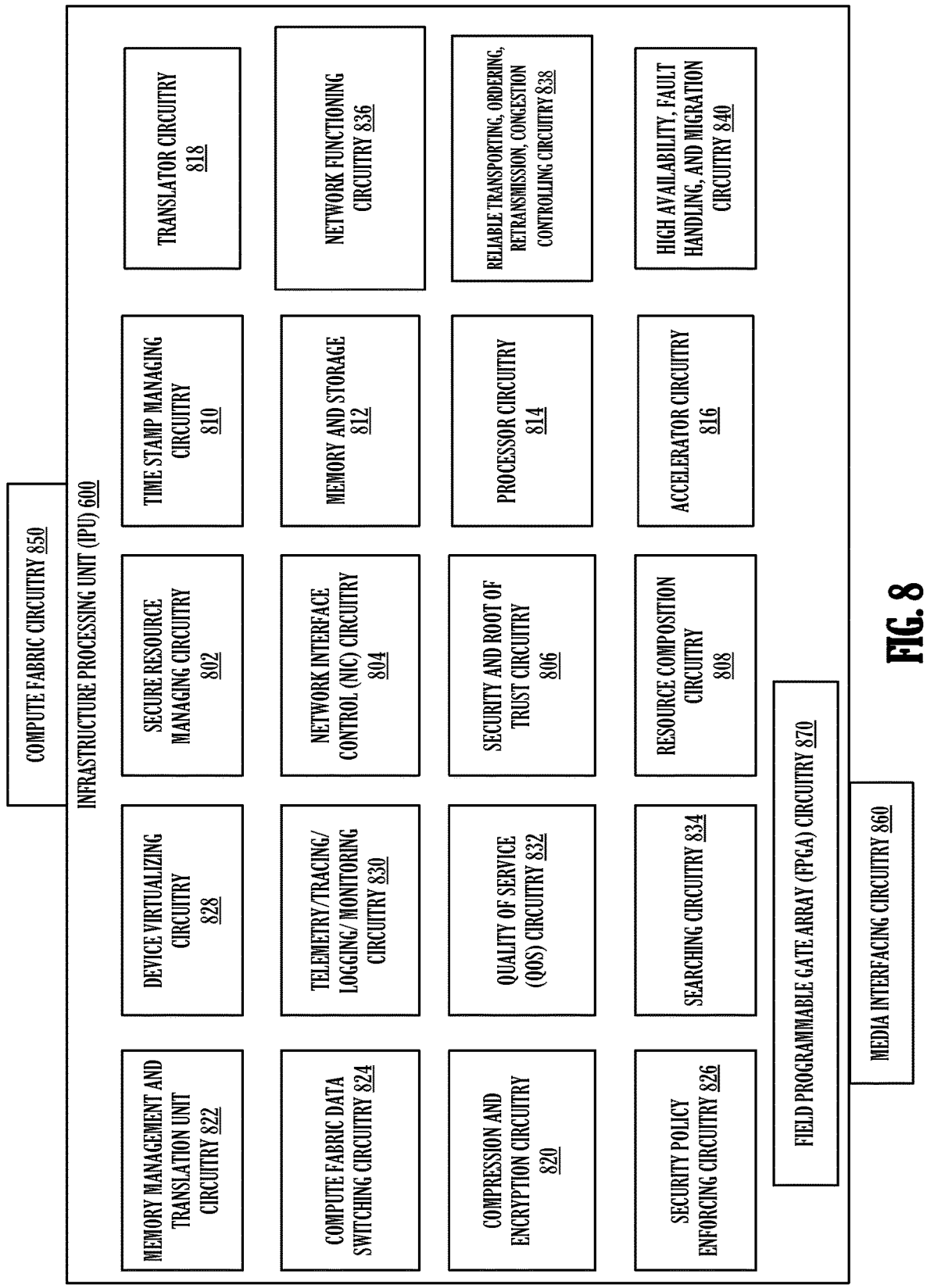
FIG. 8 is a schematic diagram of an example infrastructure processing unit (IPU), according to an embodiment.

FIG. 8 depicts an example of an infrastructure processing unit (IPU). Different examples of IPUs disclosed herein enable improved performance, management, security and coordination functions between entities (e.g., cloud service providers), and enable infrastructure offload or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein may perform an application including any number of microservices, where each microservice runs in its own process and communicates using protocols (e.g., an HTTP resource API, message service or gRPC). Microservices may be independently deployed using centralized management of these services. A management system may be written in different programming languages and use different data storage technologies.

Furthermore, one or more IPUs may execute platform management, networking stack processing operations, security (crypto) operations, storage software, identity and key management, telemetry, logging, monitoring and service mesh (e.g., control how different microservices communicate with one another). The IPU may access an xPU to offload performance of various tasks. For instance, an IPU exposes XPU, storage, memory, and CPU resources and capabilities as a service that may be accessed by other microservices for function composition. This may improve performance and reduce data movement and latency. An IPU may perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

In the illustrated example of FIG. 8, the IPU 800 includes or otherwise accesses secure resource managing circuitry 802, network interface controller (NIC) circuitry 804, security and root of trust circuitry 806, resource composition circuitry 808, time stamp managing circuitry 810, memory and storage 812, processing circuitry 814, accelerator circuitry 816, or translator circuitry 818. Any number or combination of other structure(s) may be used such as but not limited to compression and encryption circuitry 820, memory management and translation unit circuitry 822, compute fabric data switching circuitry 824, security policy enforcing circuitry 826, device virtualizing circuitry 828, telemetry, tracing, logging and monitoring circuitry 830, quality of service circuitry 832, searching circuitry 834, network functioning circuitry (e.g., routing, firewall, load balancing, network address translating (NAT), etc.) 836, reliable transporting, ordering, retransmission, congestion controlling circuitry 838, and high availability, fault handling and migration circuitry 840 shown in FIG. 8. Different examples may use one or more structures (components) of the example IPU 800 together or separately. For example, compression and encryption circuitry 820 may be used as a separate service or chained as part of a data flow with vSwitch and packet encryption.

In some examples, IPU 800 includes a field programmable gate array (FPGA) 870 structured to receive commands from an CPU, XPU, or application via an API and perform commands/tasks on behalf of the CPU, including workload management and offload or accelerator operations. The illustrated example of FIG. 8 may include any number of FPGAs configured or otherwise structured to perform any operations of any IPU described herein.

Example compute fabric circuitry 850 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), Hyper- Transport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 860 provides connectivity to a remote smartNIC or another IPU or service via a network medium or fabric. This may be provided over any type of network media (e.g., wired or wireless) and using any protocol (e.g., Ethernet, InfiniBand, Fiber channel, ATM, to name a few).

In some examples, instead of the server/CPU being the primary component managing IPU 800, IPU 800 is a root of a system (e.g., rack of servers or data center) and manages compute resources (e.g., CPU, xPU, storage, memory, other IPUs, and so forth) in the IPU 800 and outside of the IPU 800. Different operations of an IPU are described below.

In some examples, the IPU 800 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 800 is selected to perform a workload, secure resource managing circuitry 802 offloads work to a CPU, xPU, or other device and the IPU 800 accelerates connectivity of distributed runtimes, reduce latency, CPU and increases reliability.

In some examples, secure resource managing circuitry 802 runs a service mesh to decide what resource is to execute workload, and provide for L7 (application layer) and remote procedure call (RPC) traffic to bypass kernel altogether so that a user space application may communicate directly with the example IPU 800 (e.g., IPU 800 and application may share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh may provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited to, iSCSI, NVMe-oF, or CXL.

In some cases, the example IPU 800 dynamically selects itself to run a given workload (e.g., microservice) within a composable infrastructure including an IPU, xPU, CPU, storage, memory, and other devices in a node.

In some examples, communications transit through media interfacing circuitry 860 of the example IPU 800 through a NIC/smartNIC (for cross node communications) or loopback back to a local service on the same host. Communications through the example media interfacing circuitry 860 of the example IPU 800 to another IPU may then use shared memory support transport between xPUs switched through the local IPUs. Use of IPU-to-IPU communication may reduce latency and jitter through ingress scheduling of messages and work processing based on service level objective (SLO).

For example, for a request to a database application that requires a response, the example IPU 800 prioritizes its processing to minimize the stalling of the requesting application. In some examples, the IPU 800 schedules the prioritized message request issuing the event to execute a SQL query database and the example IPU constructs microservices that issue SQL queries and the queries are sent to the appropriate devices or services.

Figure 9:
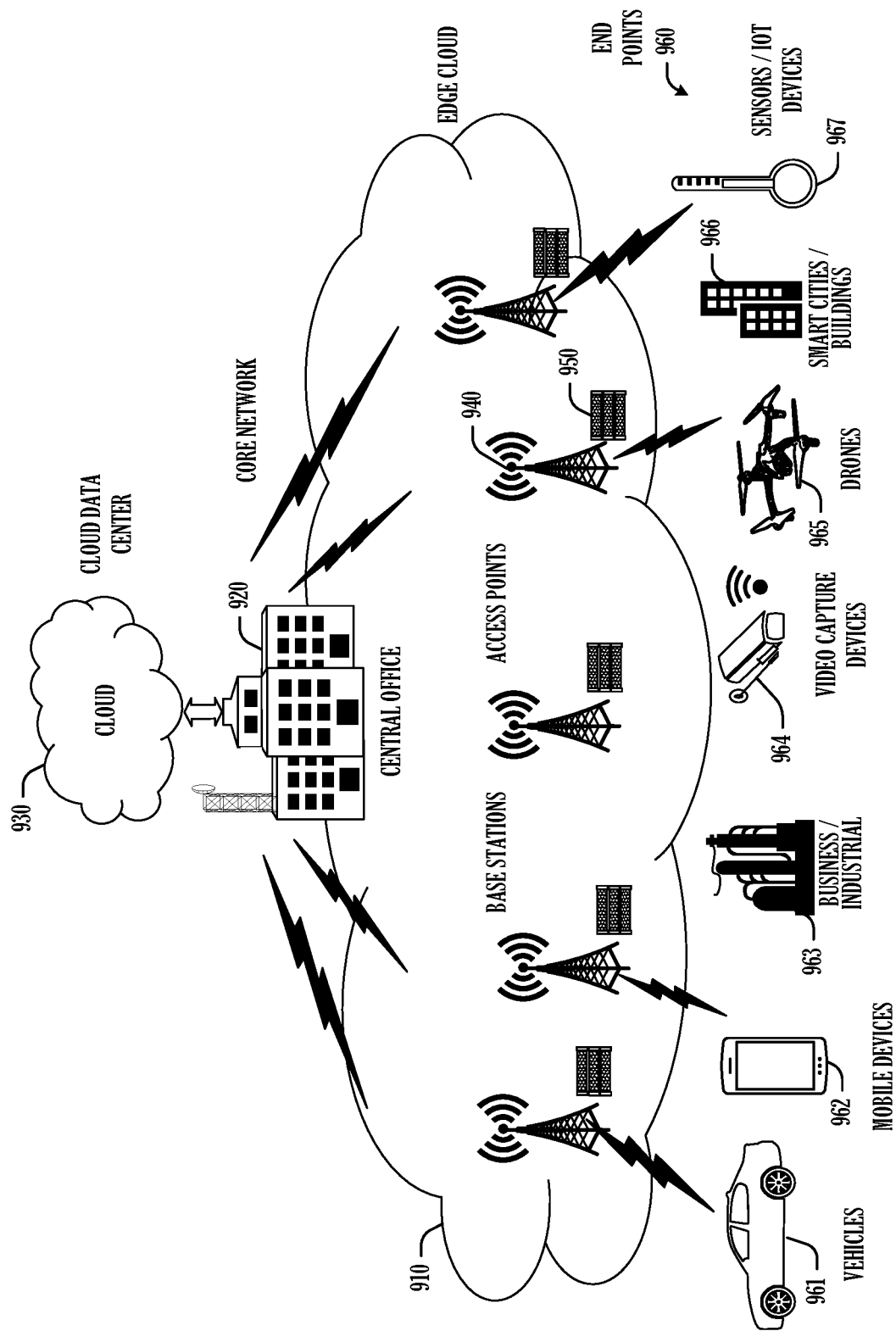
FIG. 9 illustrates an overview of an Edge cloud configuration for Edge computing.

FIG. 9 is a block diagram 900 showing an overview of a configuration for Edge computing, which includes a layer of processing referred to in many of the following examples as an "Edge cloud". As shown, the Edge cloud 910 is co-located at an Edge location, such as an access point or base station 940, a local processing hub 950, or a central office 920, and thus may include multiple entities, devices, and equipment instances. The Edge cloud 910 is located much closer to the endpoint (consumer and producer) data sources 960 (e.g., autonomous vehicles 961, user equipment 962, business and industrial equipment 963, video capture devices 964, drones 965, smart cities and building devices 966, sensors and IoT devices 967, etc.) than the cloud data center 930. Compute, memory, and storage resources which are offered at the edges in the Edge cloud 910 are critical to providing ultra-low latency response times for services and functions used by the endpoint data sources 960 as well as reduce network backhaul traffic from the Edge cloud 910 toward cloud data center 930 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 10:
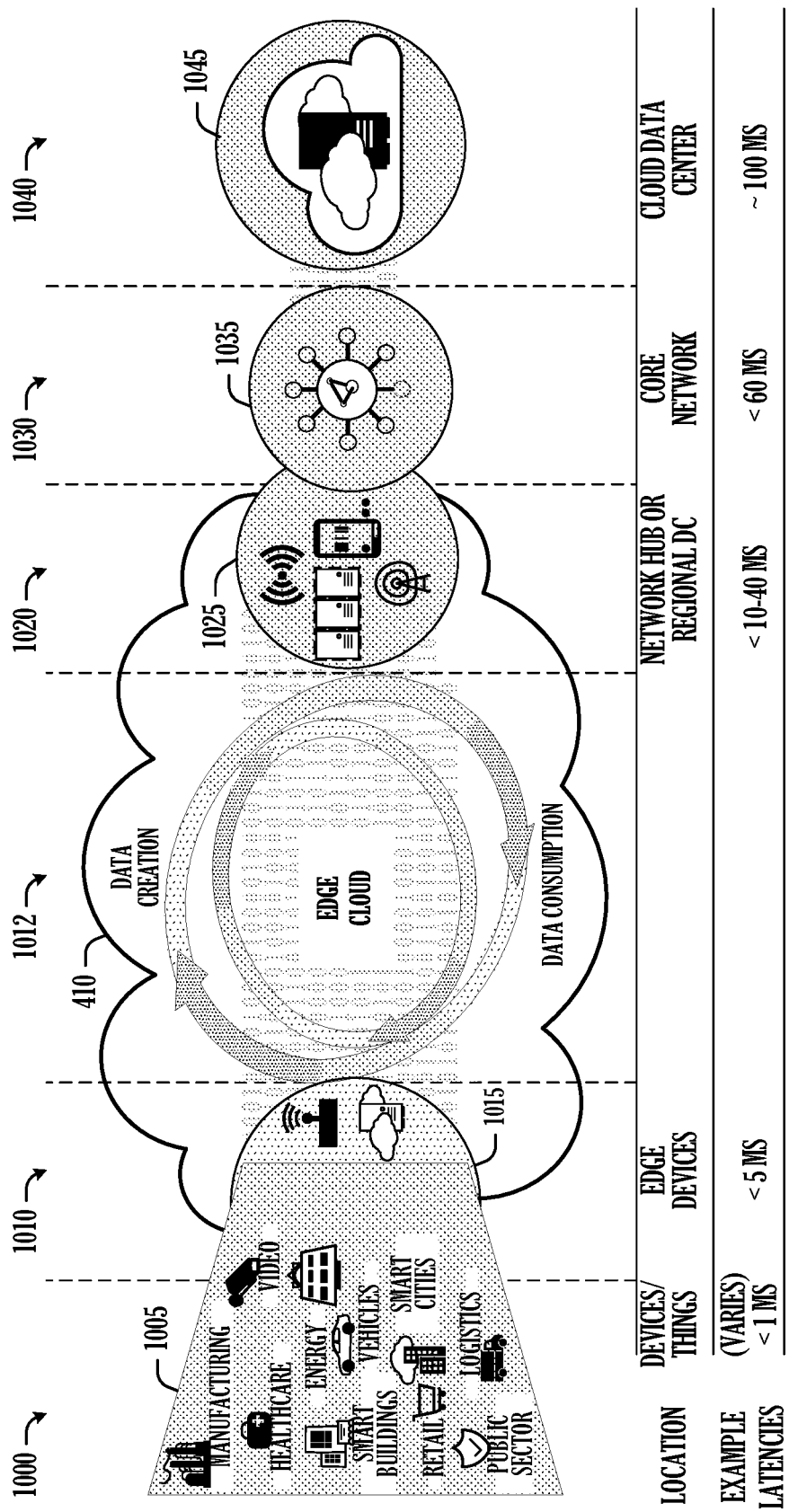
FIG. 10 illustrates operational layers among endpoints, an Edge cloud, and cloud computing environments.

FIG. 10 illustrates operational layers among endpoints, an Edge cloud, and cloud computing environments. Specifically, FIG. 10 depicts examples of computational use cases 1005, utilizing the Edge cloud 910 among multiple illustrative layers of network computing. The layers begin at an endpoint (devices and things) layer 1000, which accesses the Edge cloud 910 to conduct data creation, analysis, and data consumption activities. The Edge cloud 910 may span multiple network layers, such as an Edge devices layer 1010 having gateways, on-premise servers, or network equipment (nodes 1015) located in physically proximate Edge systems; a network access layer 1020, encompassing base stations, radio processing units, network hubs, regional data centers (DC), or local network equipment (equipment 1025); and any equipment, devices, or nodes located therebetween (in layer 1012, not illustrated in detail). The network communications within the Edge cloud 910 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1000, under 5 ms at the Edge devices layer 1010, to even between 10 to 40 ms when communicating with nodes at the network access layer 1020. Beyond the Edge cloud 910 are core network 1030 and cloud data center 1040 layers, each with increasing latency (e.g., between 50-60 ms at the core network layer 1030, to 100 or more ms at the cloud data center layer). As a result, operations at a core network data center 1035 or a cloud data center 1045, with latencies of at least 50 to 100 ms or more, will not be able to accomplish many time-critical functions of the use cases 1005. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 1035 or a cloud data center 1045, a central office or content data network may be considered as being located within a "near Edge" layer ("near" to the cloud, having high latency values when communicating with the devices and endpoints of the use cases 1005), whereas an access point, base station, on-premise server, or network gateway may be considered as located within a "far Edge" layer ("far" from the cloud, having low latency values when communicating with the devices and endpoints of the use cases 1005). It will be understood that other categorizations of a particular network layer as constituting a "close", "local", "near", "middle", or "far" Edge may be based on latency, distance, number of network hops, or other measurable characteristics, as measured from a source in any of the network layers 1000-1040.

The various use cases 1005 may access resources under usage pressure from incoming streams, due to multiple services utilizing the Edge cloud. To achieve results with low latency, the services executed within the Edge cloud 910 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 910 may provide the ability to serve and respond to multiple applications of the use cases 1005 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 910 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 910 (network layers 1000-1040), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 910.

As such, the Edge cloud 910 is formed from network components and functional features operated by and within Edge gateway nodes, Edge aggregation nodes, or other Edge compute nodes among network layers 1010-1030. The Edge cloud 910 thus may be embodied as any type of network that provides Edge computing or storage resources which are proximately located to radio access network (RAN) capable endpoint devices (e.g., mobile computing devices, IoT devices, smart devices, etc.), which are discussed herein. In other words, the Edge cloud 910 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 910 may be servers, multi-tenant servers, appliance computing devices, or any other type of computing devices. For example, the Edge cloud 910 may include an appliance computing device that is a self-contained electronic device including a housing, a chassis, a case, or a shell. In some circumstances, the housing may be dimensioned for portability such that it can be carried by a human or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), or enable submergibility. Example housings may include power circuitry to provide power for stationary or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, or wireless power inputs. Example housings or surfaces thereof may include or connect to mounting hardware to enable attachment to structures such as buildings, telecommunication structures (e.g., poles, antenna structures, etc.), or racks (e.g., server racks, blade mounts, etc.). Example housings or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface or mounted to the surface of the appliance. Example housings or surfaces thereof may support mechanical connectivity, such as propulsion hardware (e.g., wheels, rotors such as propellers, etc.) or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The Edge cloud 910 may also include one or more servers or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications or other software, code, or scripts may execute while being isolated from one or more other applications, software, code, or scripts.

Figure 11:
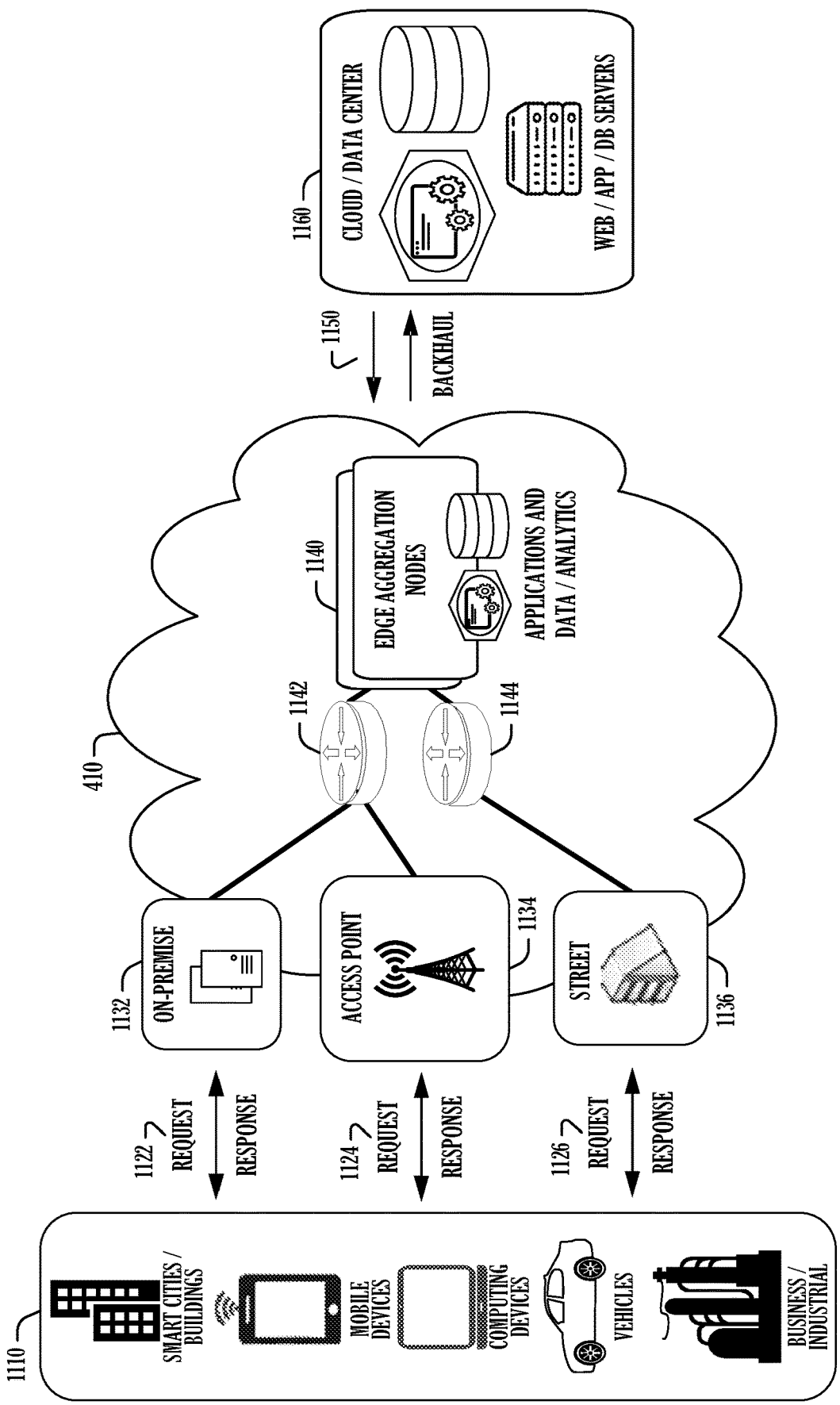
FIG. 11 illustrates an example approach for networking and services in an Edge computing system.

In FIG. 11, various client endpoints 1110 (in the form of mobile devices, computers, autonomous vehicles, business computing equipment, industrial processing equipment) exchange requests and responses that are specific to the type of endpoint network aggregation. For instance, client endpoints 1110 may obtain network access via a wired broadband network, by exchanging requests and responses 1122 through an on-premise network system 1132. Some client endpoints 1110, such as mobile computing devices, may obtain network access via a wireless broadband network, by exchanging requests and responses 1124 through an access point (e.g., a cellular network tower) 1134. Some client endpoints 1110, such as autonomous vehicles may obtain network access for requests and responses 1126 via a wireless vehicular network through a street-located network system 1136. However, regardless of the type of network access, the TSP may deploy aggregation points 1142, 1144 within the Edge cloud 910 to aggregate traffic and requests. Thus, within the Edge cloud 910, the TSP may deploy various compute and storage resources, such as at Edge aggregation nodes 1140, to provide requested content. The Edge aggregation nodes 1140 and other systems of the Edge cloud 910 are connected to a cloud or data center 1160, which uses a backhaul network 1150 to fulfill higher-latency requests from a cloud/data center for websites, applications, database servers, etc. Additional or consolidated instances of the Edge aggregation nodes 1140 and the aggregation points 1142, 1144, including those deployed on a single server framework, may also be present within the Edge cloud 910 or other areas of the TSP infrastructure.

Figure 12:
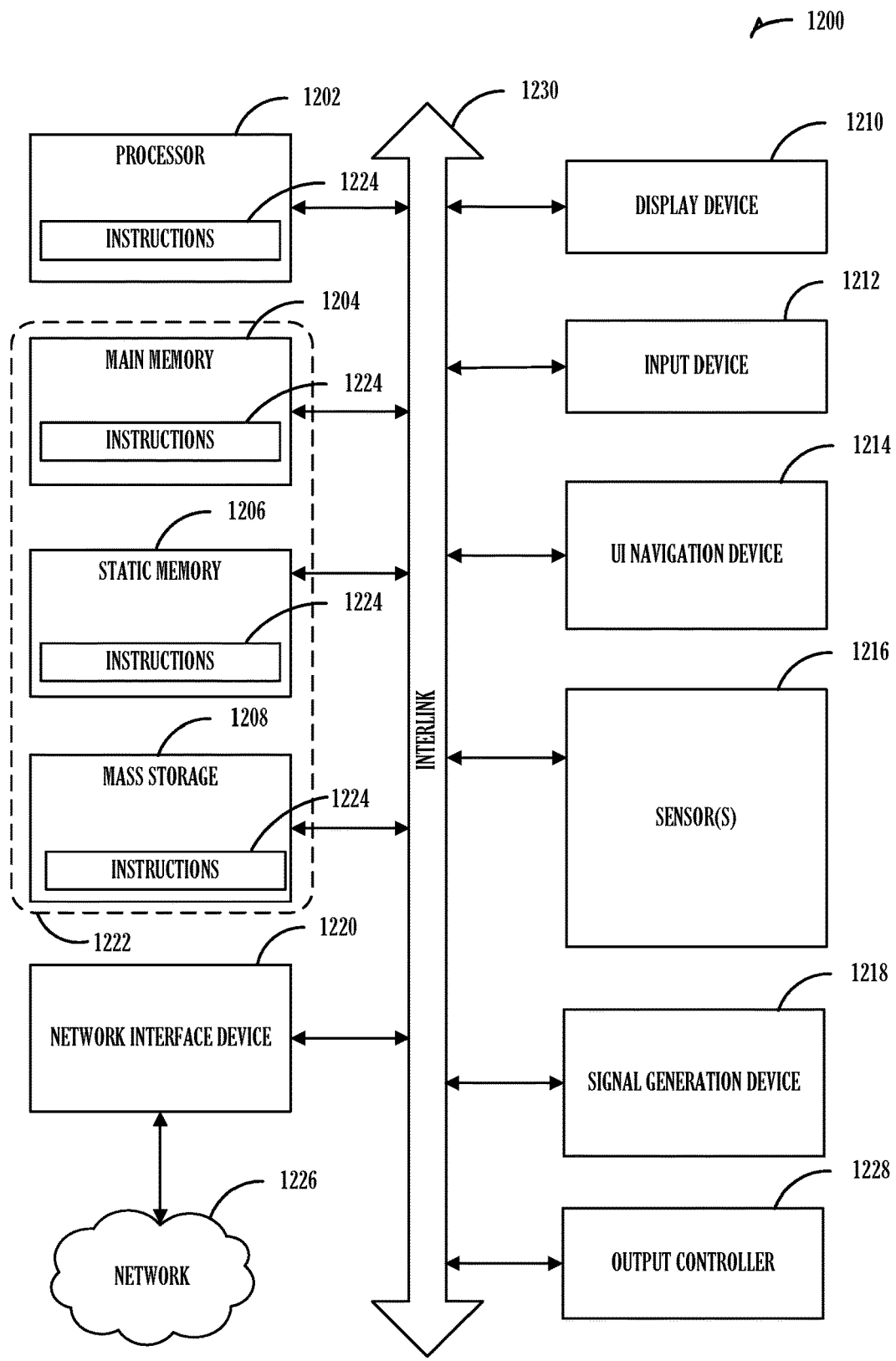
FIG. 12 is a block diagram illustrating an example of a machine upon which one or more embodiments may be implemented.

FIG. 12 illustrates a block diagram of an example machine 1200 upon which any one or more of the techniques (e.g., methodologies) discussed herein may perform. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drives, tape drives, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1222 may be representative of the instructions 1224, such as instructions 1224 themselves or a format from which the instructions 1224 may be derived. This format from which the instructions 1224 may be derived may include source code, encoded instructions (e.g., in compressed or encrypted form), packaged instructions (e.g., split into multiple packages), or the like. The information representative of the instructions 1224 in the machine readable medium 1222 may be processed by processing circuitry into the instructions to implement any of the operations discussed herein. For example, deriving the instructions 1224 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1224.

In an example, the derivation of the instructions 1224 may include assembly, compilation, or interpretation of the information (e.g., by the processing circuitry) to create the instructions 1224 from some intermediate or preprocessed format provided by the machine readable medium 1222. The information, when provided in multiple parts, may be combined, unpacked, and modified to create the instructions 1224. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

ADDITIONAL NOTES & EXAMPLES

Example 1 is a device for semantic network data correction, the device comprising: a memory including instructions; and processing circuitry that, when in operation, is configured by the instructions to: receive semantic data corresponding to a data stream, the semantic data based on the data stream; receive the data stream, the data stream comprising packets, a packet of the packets including an error due to transmission via a network link, the error introducing an ambiguity for content of the packet; and correct the error using the semantic data, the semantic data providing a constraint on the ambiguity to eliminate possible corrections for the error.

In Example 2, the subject matter of Example 1 includes, wherein, to correct the error using the semantic data, the processing circuitry is configured to provide the semantic data and the packet to a neural network, the neural network trained to produce a correct version of the packet.

In Example 3, the subject matter of Example 2 includes, wherein the neural network is executed in an infrastructure processing unit (IPU) including a network interface upon which the data stream is received.

In Example 4, the subject matter of Examples 1-3 includes, wherein the semantic data is applied to every packet in the data stream to correct any errors in the packets.

In Example 5, the subject matter of Example 4 includes, wherein the errors are corrected as each packet is received.

In Example 6, the subject matter of Examples 1-5 includes, wherein the semantic data is received from a first network channel, and wherein the data stream is received on a second network channel.

In Example 7, the subject matter of Example 6 includes, wherein the first network channel has a higher signal to noise ratio (SNR) than the second network channel.

In Example 8, the subject matter of Example 7 includes, wherein the higher SNR is achieved by a coding technique.

In Example 9, the subject matter of Examples 1-8 includes, wherein, to correct the error, the processing circuitry is configured to: determine a first priority for the packet using the semantic data and contents of the packet; determine a second priority for a second packet using the semantic data and contents of the second packet; compare the first priority and the second priority to determine that the packet has a higher priority; and correct the error in the packet before correcting a second error in the second packet based on the determination that the packet has the higher priority.

In Example 10, the subject matter of Examples 1-9 includes, wherein the instructions further configure the processing circuitry to: extract second semantic data from a second data stream; transmit the second semantic data to a receiving node; and transmit the second data stream to the receiving node.

In Example 11, the subject matter of Example 10 includes, wherein, to extract the second semantic data from the second data stream, the processing circuitry is configured to provide the second data stream to a neural network trained to produce semantic data to create the second semantic data.

Example 12 is a method for semantic network data correction, the method comprising: receiving semantic data corresponding to a data stream, the semantic data based on the data stream; receiving the data stream, the data stream comprising packets, a packet of the packets including an error due to transmission via a network link, the error introducing an ambiguity for content of the packet; and correcting the error using the semantic data, the semantic data providing a constraint on the ambiguity to eliminate possible corrections for the error.

In Example 13, the subject matter of Example 12 includes, wherein correcting the error using the semantic data includes providing the semantic data and the packet to a neural network, the neural network trained to produce a correct version of the packet.

In Example 14, the subject matter of Example 13 includes, wherein the neural network is executed in an infrastructure processing unit (IPU) including a network interface upon which the data stream is received.

In Example 15, the subject matter of Examples 12-14 includes, wherein the semantic data is applied to every packet in the data stream to correct any errors in the packets.

In Example 16, the subject matter of Example 15 includes, wherein the errors are corrected as each packet is received.

In Example 17, the subject matter of Examples 12-16 includes, wherein the semantic data is received from a first network channel, and wherein the data stream is received on a second network channel.

In Example 18, the subject matter of Example 17 includes, wherein the first network channel has a higher signal to noise ratio (SNR) than the second network channel.

In Example 19, the subject matter of Example 18 includes, wherein the higher SNR is achieved by a coding technique.

In Example 20, the subject matter of Examples 12-19 includes, wherein correcting the error includes: determining a first priority for the packet using the semantic data and contents of the packet; determining a second priority for a second packet using the semantic data and contents of the second packet; comparing the first priority and the second priority to determine that the packet has a higher priority; and correcting the error in the packet before correcting a second error in the second packet based on the determination that the packet has the higher priority.

In Example 21, the subject matter of Examples 12-20 includes, extracting second semantic data from a second data stream; transmitting the second semantic data to a receiving node; and transmitting the second data stream to the receiving node.

In Example 22, the subject matter of Example 21 includes, wherein extracting the second semantic data from the second data stream includes providing the second data stream to a neural network trained to produce semantic data to create the second semantic data.

Example 23 is a machine readable medium including instructions for semantic network data correction, the instructions, when executed by processing circuitry, cause the processing circuitry to perform operations comprising: receiving semantic data corresponding to a data stream, the semantic data based on the data stream; receiving the data stream, the data stream comprising packets, a packet of the packets including an error due to transmission via a network link, the error introducing an ambiguity for content of the packet; and correcting the error using the semantic data, the semantic data providing a constraint on the ambiguity to eliminate possible corrections for the error.

In Example 24, the subject matter of Example 23 includes, wherein correcting the error using the semantic data includes providing the semantic data and the packet to a neural network, the neural network trained to produce a correct version of the packet.

In Example 25, the subject matter of Example 24 includes, wherein the neural network is executed in an infrastructure processing unit (IPU) including a network interface upon which the data stream is received.

In Example 26, the subject matter of Examples 23-25 includes, wherein the semantic data is applied to every packet in the data stream to correct any errors in the packets.

In Example 27, the subject matter of Example 26 includes, wherein the errors are corrected as each packet is received.

In Example 28, the subject matter of Examples 23-27 includes, wherein the semantic data is received from a first network channel, and wherein the data stream is received on a second network channel.

In Example 29, the subject matter of Example 28 includes, wherein the first network channel has a higher signal to noise ratio (SNR) than the second network channel.

In Example 30, the subject matter of Example 29 includes, wherein the higher SNR is achieved by a coding technique.

In Example 31, the subject matter of Examples 23-30 includes, wherein correcting the error includes: determining a first priority for the packet using the semantic data and contents of the packet; determining a second priority for a second packet using the semantic data and contents of the second packet; comparing the first priority and the second priority to determine that the packet has a higher priority; and correcting the error in the packet before correcting a second error in the second packet based on the determination that the packet has the higher priority.

In Example 32, the subject matter of Examples 23-31 includes, wherein the operations comprise: extracting second semantic data from a second data stream; transmitting the second semantic data to a receiving node; and transmitting the second data stream to the receiving node.

In Example 33, the subject matter of Example 32 includes, wherein extracting the second semantic data from the second data stream includes providing the second data stream to a neural network trained to produce semantic data to create the second semantic data.

Example 34 is a system for semantic network data correction, the system comprising: means for receiving semantic data corresponding to a data stream, the semantic data based on the data stream; means for receiving the data stream, the data stream comprising packets, a packet of the packets including an error due to transmission via a network link, the error introducing an ambiguity for content of the packet; and means for correcting the error using the semantic data, the semantic data providing a constraint on the ambiguity to eliminate possible corrections for the error.

In Example 35, the subject matter of Example 34 includes, wherein the means for correcting the error using the semantic data include means for providing the semantic data and the packet to a neural network, the neural network trained to produce a correct version of the packet.

In Example 36, the subject matter of Example 35 includes, wherein the neural network is executed in an infrastructure processing unit (IPU) including a network interface upon which the data stream is received.

In Example 37, the subject matter of Examples 34-36 includes, wherein the semantic data is applied to every packet in the data stream to correct any errors in the packets.

In Example 38, the subject matter of Example 37 includes, wherein the errors are corrected as each packet is received.

In Example 39, the subject matter of Examples 34-38 includes, wherein the semantic data is received from a first network channel, and wherein the data stream is received on a second network channel.

In Example 40, the subject matter of Example 39 includes, wherein the first network channel has a higher signal to noise ratio (SNR) than the second network channel.

In Example 41, the subject matter of Example 40 includes, wherein the higher SNR is achieved by a coding technique.

In Example 42, the subject matter of Examples 34-41 includes, wherein the means for correcting the error include: means for determining a first priority for the packet using the semantic data and contents of the packet; means for determining a second priority for a second packet using the semantic data and contents of the second packet; means for comparing the first priority and the second priority to determine that the packet has a higher priority; and means for correcting the error in the packet before correcting a second error in the second packet based on the determination that the packet has the higher priority.

In Example 43, the subject matter of Examples 34-42 includes, means for extracting second semantic data from a second data stream; means for transmitting the second semantic data to a receiving node; and means for transmitting the second data stream to the receiving node.

In Example 44, the subject matter of Example 43 includes, wherein the means for extracting the second semantic data from the second data stream include means for providing the second data stream to a neural network trained to produce semantic data to create the second semantic data.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for semantic network data correction, the device comprising:
a non-transitory memory including instructions; and
processing circuitry that, when in operation, is configured by the instructions to:
receive semantic data corresponding to a data stream, the semantic data based on the data stream;
receive the data stream, the data stream comprising packets, a packet of the packets including an error due to transmission via a network link, the error introducing an ambiguity for content of the packet; and
correct the error using the semantic data, the semantic data providing a constraint on the ambiguity to eliminate possible corrections for the error.

2. The device of claim 1, wherein, to correct the error using the semantic data, the processing circuitry is configured to provide the semantic data and the packet to a neural network, the neural network trained to produce a correct version of the packet.

3. The device of claim 2, wherein the neural network is executed in an infrastructure processing unit (IPU) including a network interface upon which the data stream is received.

4. The device of claim 1, wherein the semantic data is applied to every packet in the data stream to correct any errors in the packets.

5. The device of claim 4, wherein the errors are corrected as each packet is received.

6. The device of claim 1, wherein the semantic data is received from a first network channel, and wherein the data stream is received on a second network channel.

7. The device of claim 1, wherein, to correct the error, the processing circuitry is configured to:
determine a first priority for the packet using the semantic data and contents of the packet;
determine a second priority for a second packet using the semantic data and contents of the second packet;
compare the first priority and the second priority to determine that the packet has a higher priority; and
correct the error in the packet before correcting a second error in the second packet based on the determination that the packet has the higher priority.

8. The device of claim 1, wherein the instructions further configure the processing circuitry to:
extract second semantic data from a second data stream;
transmit the second semantic data to a receiving node; and
transmit the second data stream to the receiving node.

9. A method for semantic network data correction, the method comprising:
receiving semantic data corresponding to a data stream, the semantic data based on the data stream;
receiving the data stream, the data stream comprising packets, a packet of the packets including an error due to transmission via a network link, the error introducing an ambiguity for content of the packet; and
correcting the error using the semantic data, the semantic data providing a constraint on the ambiguity to eliminate possible corrections for the error.

10. The method of claim 9, wherein correcting the error using the semantic data includes providing the semantic data and the packet to a neural network, the neural network trained to produce a correct version of the packet.

11. The method of claim 10, wherein the neural network is executed in an infrastructure processing unit (IPU) including a network interface upon which the data stream is received.

12. The method of claim 9, wherein the semantic data is applied to every packet in the data stream to correct any errors in the packets.

13. The method of claim 12, wherein the errors are corrected as each packet is received.

14. The method of claim 9, wherein the semantic data is received from a first wireless network channel, and wherein the data stream is received on a second wireless network channel.

15. The method of claim 9, wherein correcting the error includes:
determining a first priority for the packet using the semantic data and contents of the packet;
determining a second priority for a second packet using the semantic data and contents of the second packet;
comparing the first priority and the second priority to determine that the packet has a higher priority; and
correcting the error in the packet before correcting a second error in the second packet based on the determination that the packet has the higher priority.

16. The method of claim 9, comprising:
extracting second semantic data from a second data stream;
transmitting the second semantic data to a receiving node; and
transmitting the second data stream to the receiving node.

17. A non-transitory machine readable medium including instructions for semantic network data correction, the instructions, when executed by processing circuitry, cause the processing circuitry to perform operations comprising:
receiving semantic data corresponding to a data stream, the semantic data based on the data stream;
receiving the data stream, the data stream comprising packets, a packet of the packets including an error due to transmission via a network link, the error introducing an ambiguity for content of the packet; and
correcting the error using the semantic data, the semantic data providing a constraint on the ambiguity to eliminate possible corrections for the error.

18. The non-transitory machine readable medium of claim 17, wherein correcting the error using the semantic data includes providing the semantic data and the packet to a neural network, the neural network trained to produce a correct version of the packet.

19. The non-transitory machine readable medium of claim 18, wherein the neural network is executed in an infrastructure processing unit (IPU) including a network interface upon which the data stream is received.

20. The non-transitory machine readable medium of claim 17, wherein the semantic data is applied to every packet in the data stream to correct any errors in the packets.

21. The non-transitory machine readable medium of claim 20, wherein the errors are corrected as each packet is received.

22. The non-transitory machine readable medium of claim 17, wherein the semantic data is received from a first wireless network channel, and wherein the data stream is received on a second wireless network channel.

23. The non-transitory machine readable medium of claim 17, wherein correcting the error includes:
determining a first priority for the packet using the semantic data and contents of the packet;
determining a second priority for a second packet using the semantic data and contents of the second packet;
comparing the first priority and the second priority to determine that the packet has a higher priority; and
correcting the error in the packet before correcting a second error in the second packet based on the determination that the packet has the higher priority.

24. The non-transitory machine readable medium of claim 17, wherein the operations comprise:
extracting second semantic data from a second data stream;
transmitting the second semantic data to a receiving node; and
transmitting the second data stream to the receiving node.

* * * * *